United States Patent [19]
Ehbets et al.

[11] Patent Number: 5,815,251
[45] Date of Patent: Sep. 29, 1998

[54] DEVICE FOR DISTANCE MEASUREMENT

[75] Inventors: Hartmut Ehbets, Platz; Heinz Bernhard, Grub; Kurt Giger, Ruethi; Juerg Hinderling, Heerbrugg, all of Switzerland

[73] Assignee: Leica Geosystems AG, Heerbrugg, Switzerland

[21] Appl. No.: 537,852

[22] PCT Filed: May 4, 1994

[86] PCT No.: PCT/EP94/01412

§ 371 Date: Nov. 15, 1995

§ 102(e) Date: Nov. 15, 1995

[87] PCT Pub. No.: WO94/27164

PCT Pub. Date: Nov. 24, 1994

[30] Foreign Application Priority Data

May 15, 1993 [DE] Germany ............ 43 16 348.3

[51] Int. Cl.$^6$ ............................................. G01C 3/08
[52] U.S. Cl. ................................. 356/5.01; 356/5.1
[58] Field of Search ....................... 356/5.01–5.15, 356/4.01; 396/106

[56] References Cited

U.S. PATENT DOCUMENTS

| | | | |
|---|---|---|---|
| 3,813,165 | 5/1974 | Hines et al. | 356/5.12 |
| 4,113,381 | 9/1978 | Epstein | 356/5.12 |
| 4,380,391 | 4/1983 | Buser et al. | |
| 4,498,764 | 2/1985 | Bolkow et al. | |
| 4,818,099 | 4/1989 | Preikschat et al. | |
| 5,082,364 | 1/1992 | Russell | |
| 5,121,401 | 6/1992 | Dahl | |
| 5,180,922 | 1/1993 | Hug | 250/561 |

FOREIGN PATENT DOCUMENTS 40 02 356  2/1991  Germany.

OTHER PUBLICATIONS

K. Grimm et al., "Distanzmessung nach dem Laufzeitmessverfahren mmit geodaetischer Genauigkeit", pp. 1–16, Wild Heerbrugg AG, Switzerland.

B. Duello, "Optischer Distanzsensor and Basis der Lichtlaufzeitmessung", *Industrie* pp. 6–8, Nov. 1992.

*Primary Examiner*—Stephen C. Buczinski
*Attorney, Agent, or Firm*—Foley & Lardner

[57] ABSTRACT

A device for measuring distance with a visible measuring beam (11) generated by a semiconductor laser (10), a collimator object lens (12) to collimate the measuring beam towards the optical axis (13) of the collimator object lens (12), a radiation arrangement to modulate the measuring radiation, a reception object lens (15) to receive and image the measuring beam reflected from a distant object (16) on a receiver, a switchable beam deflection device (28) to generate an internal reference path between the semiconductor laser (10) and the receiver and an electronic evaluation device (25) to find and display the distance measured from the object. According to the invention, the receiver contains a light guide (17') with a downstream optoelectronic transducer (24), in which the light guide inlet surface (17) is arranged in the imaging plane of the reception object lens (15) for long distances from the object and can be controllably moved (18') from this position (18) transversely to the optical axis (14). In an alternative embodiment, the light inlet surface (17) is fixed and there are optical means (36) outside the optical axis (14) of the reception object lens (15) which, for short object distances, deflect the imaging position of the measuring beam to the optical axis (14) of the reception object lens (15). The measuring radiation is pulse modulated with excitation pulses with a pulse width of less than two nanoseconds.

35 Claims, 3 Drawing Sheets

1

DEVICE FOR DISTANCE MEASUREMENT

BACKGROUND OF THE INVENTION

The invention relates to a device for distance measurement.

A device of this type is known from a publication from the company of Wild Heerbrugg AG, Switzerland, V.86, under the title "Distanzmessung nach dem Laufzeitmeβ-verfahren mit geodätische Genauigkeit" (Distance measurement according to the propagation time measurement method with geodetic accuracy). It is also used for the measurement of distances to objects having natural rough surfaces. Thus, in the surveying of surfaces which are difficult to access such as quarries, cavern walls, tunnel profiles, etc., in which distances up to several 100 m must be measured, devices are used in which pulsed infrared semiconductor laser diodes with large emitting surfaces serve as radiation sources. Pulse lengths of 12 nsec are used. The advantage of these radiation sources consists in the fact that radiation pulses of high peak power in the order of magnitude of several watts can be generated, with the result therefore that the required measuring distances of several 100 m can be reached. The accuracy is 5–10 mm. One disadvantage results from the relatively large dimensions of the emitting surface of these lasers of the order of magnitude of 300 μm. Such large dimension cause the radiation lobe from these devices to have a divergence of about 2 mrad, as a result of which, at only 50 m, a beam cross section of 0.1 m is present. In the case of a very short distance, the beam cross section of this device still has a diameter of several centimeters, since in order to transmit the pulsed power of several watts at 2 mrad beam divergence, objective lens diameters of several centimeters are needed.

Since the transmitting and receiving objective lenses are arranged separately, for the near range below 10 to 15 m, an auxiliary lens must be fitted to cover the transmitting and receiving beams. A further disadvantage consists in the fact that, because of the infrared measurement radiation, the point which is currently being measured on the object is not detectable. In order to make the target visible, an additional laser with visible radiation emission is provided, the beam axis of which must be carefully adjusted to the transmitting beam axis. Such a device is equipped with an electronic evaluation and display device, which also permits additional values to be entered via a keyboard and calculations to be carried out.

Likewise, a distance measuring device with separate transmitting and receiving objective lenses is known from DE 40 02 356 C1. The transmitting device contains two electronically complementary-switchable laser diodes, one of which sends the light wave trains on the measuring path, the other sending the light wave trains on the reference path. Both light wave trains are alternately received by the same photoreceiver, which is connected to an electronics evaluation means. Whether the laser diodes emit visible light cannot be gleaned from the publication. The distance range to be measured is specified as 2 to 10 m and the measurement accuracy is intended to be in the range of a few mm.

In the journal "Industrie", November 1992, pages 6–8, a distance measuring device DME 2000 from the Sick GmbH company is described. The device carries out an optical distance measurement on the basis of propagation time measurement, and operates with two semiconductor laser diodes emitting visible light. The required transmitting light is generated by a laser diode with collimator optics, and the second laser diode supplies the necessary reference signal directly to the receiver. The transmitting beam and the receiving beam are arranged to be coaxial to each other, so that only one single objective lens of relatively large diameter is used. The measuring distance to natural rough surfaces is 0.1 to 2 m with a light spot diameter of about 3 mm. For greater distances from the object, up to 130 m, a reflector film must be applied to the object to be measured. The light spot diameter at these distances is about 250 mm. In conjunction with the coaxial transmitting-receiving optics, a relatively large-area PIN photodiode is used as receiver. Hence, although an overlap of the strongly divergent receiving light cone with the transmitting beam is achieved, with the result that distances down to 0.1 m can be measured, no great measurement ranges can be achieved with these large-area detectors without additional reflectors.

In the construction industry, in particular in internal construction and in the installation industry, it is necessary to be able to measure distances of up to 30 m on rough surfaces without the additional reflectors. In the case of a required measurement accuracy of 1 to 2 mm, the divergence of the receiving beam must be as small as possible, since otherwise the ambient light proportion received at the same time would generate too large a noise signal in the receiver. A small divergence of the receiving beam of about 2 mrad, however, has the disadvantage that, in the case of separate transmitting and receiving optics, an overlap of the receiving beam with the transmitting beam is only present after 1 to 2 m, so that only distance measurements beyond this distance are possible.

SUMMARY OF THE INVENTION

The invention was therefore based on the object of making possible a distance measurement to natural rough surfaces in the entire distance range from the front edge of the measurement device up to at least 30 m using a strongly collimated visible measuring beam which, in the near range, has a diameter of less than 0.5 cm and, in the distant limiting range, a diameter of 1 to 2 cm. The accuracy of the measurement in this case is intended to lie in the millimeter range.

This object is achieved by a distance measuring device according to the invention.

According to the invention, the collimator objective lens generates a strongly focused measuring beam along its optical axis. The optical axis of the receiving objective lens, arranged alongside, runs at least virtually parallel to the optical axis of the collimator objective lens and lies with the latter in a common plane. The unavoidable divergence of the measuring beam, the relatively closely adjacent optical imaging systems and the focal lengths of this system have the effect that a measuring beam reflected at objects up to about 2 m proximity is imaged virtually at the focal point of the receiving objective lens. As a result of the concentration of the received light in a small area, no intensity problems arise for the signal evaluation even out as far as the remote measured distances.

For small measured distances, however, it is to be observed that the image position of the measured spot reflected at the object is increasingly remote from the focal point longitudinally and transversely to the optical axis of the receiving objective lens. The light guide entry surface, arranged at the focal point, then receives no more light, as a result of which the lower measuring limit is reached. According to one embodiment of the invention, the light guide entry surface tracks the displacement of the image position of the measuring spot, specifically only transversely with respect to the optical axis of the receiving objective lens. Tracking along the optical axis can be dispensed with, since intensity problems in respect of the measuring beam reflected at near objects do not arise. It has even been proved that tracking into the correct image position leads to overdriving of the evaluation electronics. The controllably displaceable light guide entry surface offers, for all measured distances, the capability of adaptation to the optimal signal level.

A solution which is an alternative thereto consists in arranging the light guide entry surface in a stationary manner and taking care, by optical deflection means, that the measuring beams which, in the case of short distances from the object, are increasingly more obliquely incident on the receiving objective lens, are deflected towards the light guide entry surface. Here, too, use is made of the knowledge that a deflection which is correct in terms of imaging optics is not needed, since intensity problems do not arise in the case of close distances from the object. This solution is advantaged in that it manages without moving elements in the receiving channel.

An effect which limits the measuring accuracy of the device according to the invention results from the physical properties of the modulated laser radiation in conjunction with the rough surfaces to be measured.

The visible radiation of the semiconductor laser diodes is emitted as a spectrum of equidistant spectral lines (modes). During the action of the modulation current, both the wavelengths and also the radiation densities (intensities) of the modes change. Dependent on the wavelength, different modulation phase shifts of the laser pulse therefore result in relation to the electric modulation pulse. In this case, the modulation phase relates to the time median $t_s$ of the intensity variation I(t) over the emission duration t of the laser pulse during one modulation pulse. Mathematically, $t_s$ is equal to the integral over $I(t)*t*dt$ divided by the integral over $I(t)*dt$, the integration range being equal to the entire laser pulse duration.

Based on the type of modulation and modulation pulse width, modulation phase differences that vary according to the wavelength can correspond to laser pulse time delays of up to 1.3 ns. The corresponding apparent distance differences go up to 200 mm.

The light scattered back from the rough surface to be measured has a granular intensity distribution because of the coherence of the laser radiation, and this is known under the designation speckles. Only in the direction in which the laser radiation would be reflected if the rough surface were a mirror, do the speckles of the various modes of the laser radiation coincide. Because of the different wavelengths of the modes, this is not the case for all other directions, so that a radiation field is present with spatially different modulation phases.

The radiation which is incident on the receiving objective lens and is fed to the photodetector has a representative modulation phase which is produced as the result of the averaging, weighted with the corresponding intensity, over all the modulation phases of the radiation field incident on the objective lens. This measured average of the modulation phases fluctuates according to the speckle structure over the radiation field, that is to say according to the structure of the rough surface. By displacing an object which has a surface, which appears to be macroscopically uniform, at right angles to the measuring direction, it can be detected that the distance error corresponding to this modulation phase fluctuation can be up to 20 mm.

Surprisingly, it was proved that a decisive improvement in the physical condition can be achieved simply by the modulation of the laser diodes being generated using excitation pulses of which the pulse width is smaller than 2 ns. Depending on the wavelength, the modulation phase differences between all modes of the light reflected and falling on the objective lens then become so small that the corresponding distance fluctuations become smaller than 2 mm.

The use of light guides in distance measuring devices is known per se. In conjunction with the present subject matter of the invention, the particular advantage results in that the waveguide can be curved many times in its course towards the optoelectronic converter. By this means, the above-described weighted averaging over all the modulation phases is additionally supported.

To compensate for drift effects in the electronics and in the optoelectronic converters, it is known that, before and after the external distance measurement, by way of comparison, known lengths are measured via an internal reference path. For this purpose, in the subject matter of the invention, a light-scattering element is switched into the collimated measuring beam in such a way that no radiation passes via the external light path. The scattering characteristic of this element is matched to the spatial range over which the light guide entry surface is adjusted. As a result, two advantages which are essential for the functioning of the device are achieved. On the one hand, it is achieved that radiation from each part of the measuring beam passes into the light guide entry surface, as a result of which differences in the modulation phase over the cross section of the measuring beam have no influence on the distance measurement. Since the radiation is scattered by the light-scattering element in the entire spatial range in which the light guide entry surface is moved, the reference measurement can be carried out in any position of the light guide entry surface, immediately and without renewed readjustment of the position, as a result of which a short measuring time is achieved. The scattering intensity per unit area can be adjusted such that over-driving of the evaluation device is reliably avoided. This measure therefore has significance not only for the arrangement with an adjustable light guide entry surface but also in the same way for the alternative arrangement having a stationary light guide entry surface and additional beam deflection means.

BRIEF DESCRIPTION OF THE DRAWINGS

The device according to the invention is described in more detail hereinafter using exemplary embodiments represented schematically in the drawing, further advantages also being described. In detail.

DETAILED DESCRIPTION OF THE PREFERRED EMBODIMENTS

Figure 1:
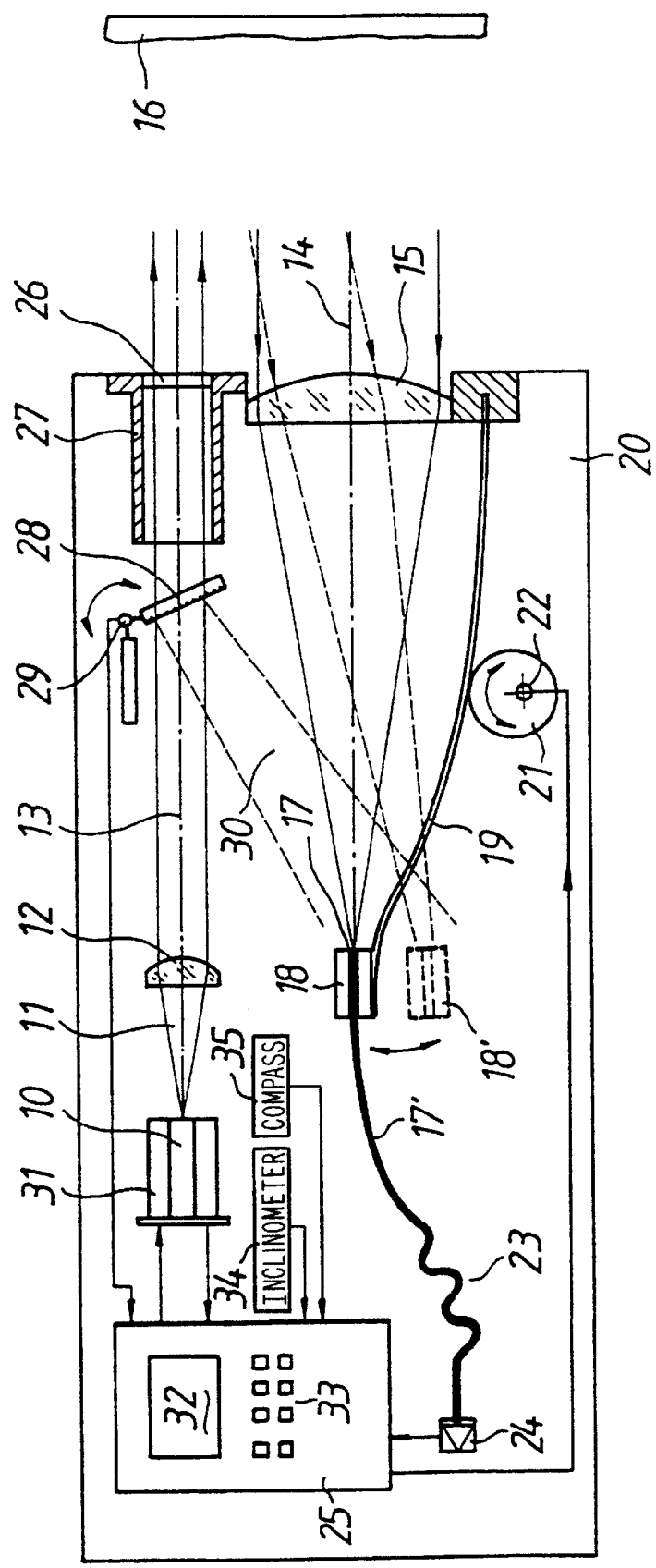
FIG. 1 shows an overall representation of the device with an adjustable light guide entry surface, in top view.

In FIG. 1, a semiconductor laser 10 generates a variable measuring beam 11 which is emitted through a collimator objective lens 12 in the direction of the optical axis 13 as a parallel beam and has a diameter of about 4 mm. The optical axis 14 of the receiving objective lens 15 runs at least approximately parallel to the optical axis 13 of the collimator objective lens 12 and lies with the latter in one plane. The diameter of the receiving objective lens 15 is about 30 mm and the acceptance angle about 120°, so that, on the one hand, the beam cross section for radiation intensities reflected from far-removed objects 16 is sufficiently large, and on the other hand, the radiation reflected from near objects at a large angle of incidence can be accepted.

Far-removed objects 16 appear to lie at infinity for the receiving optics 15, so that the image location of the measured spot produced on the object lies on the optical axis 14 at the focus of the receiving objective lens 15. The light guide entry surface 17 is arranged here in its basic position. The end of the light guide is surrounded by a mount 18 which is fastened to a leafspring 19. The other end of the leafspring 19 is rigidly clamped to the housing 20 of the distance measuring device and therefore forms a spring joint. The leafspring 19 rests under pretension on an eccentric 21 which can be rotated by a motor about an axis 22. The mount 18 is moved during the rotation of the eccentric 21, for example into the position 18', transversely to the optical axis 14. The adjustment travel is about 3 mm in a practical exemplary embodiment. In the position 18', radiation is received from a near object, which is indicated by the receiving beam drawn with a dashed line. The adjustment of the light guide entry surface runs approximately in the focal plane of the receiving objective lens 15. The correct image position of the near measuring spot lies, as can be seen, behind the focal plane in the light direction.

Instead of the adjusting device, selected in the exemplary embodiment, having a spring joint and an eccentric, other constructional configurations are possible, such as slides or multiple-joint elements.

The front section of the light guide 17' can move freely, so that it can follow the adjustment of the mount 18. In its rear section 23, it is fixedly curved many times. At its end, an optoelectronic converter 24 is connected downstream of the light guide exit surface. The received signals are fed to an evaluation device 25.

Inserted in the region of the measuring beam 11 emerging from the housing 20 of the device is a low-reflection silvered termination disk 26 which, for the suppression of reflections, can also be set obliquely to the beam. In order to avoid residual stray radiation getting to the light guide entry surface 17, a tubular aperture stop 27 is also provided. Arranged in front of the light entry opening of this aperture stop 27 is a switchable beam deflection device 28 which can be pivoted by means of a motor about an axis 29. The surface of the beam deflection device 28 on which the measuring beam 11 falls is a scattering, surface that generates a divergent scattering cone 30 being. The opening of the scattering cone 30 in the region of the light guide entry surface 17 is sufficiently large for radiation from the reference light path thus produced to be received in all positions of the light guide entry surface 17.

The evaluation unit 25 also contains the electronics for modulation of the semiconductor laser 10. To adjust the emission direction of the semiconductor laser 10 to the optical axis 13 of the collimator objective lens 12, the housing of the semiconductor laser 10 can be mounted so as to pivot about an axis 31 or an axis at right angles thereto. The adjustment can be motor-controlled via the evaluation device 25 as a function of a selected received signal. To compensate for slight faulty adjustments of the optical axes 13, 14 to a common plane, it can also be advantageous to be able to adjust the light guide entry surface 17 not only in the plane of the optical axes 13, 14, but also at right angles thereto. By means of a suitable scanning movement in the focal plane of the receiving objective lens 15, the location having an optimum signal level can be determined and the signal evaluation can be undertaken in this position of the light guide entry surface 17.

The evaluation device 25 contains a display device 32 and a keyboard 33 via which, for example, correction values or information supplementary to the actual distance measurement can be entered. An important supplementary item of information is the taking into account of the horizontal position or vertical position of the plane defined by the two optical axes 13, 14, in order to be able to measure actually at right angles to the object. For this purpose, the device can be assigned, for example, a two-axis electronic inclinometer 34, the horizontal axes of which lie in the plane of the optical axes 13, 14 and are aligned parallel and at right angles to these axes.

The output signals from the inclinometer 34 can be fed to the evaluation device 25 and automatically taken into account during the distance measurement. However, they can also be used for the mechanical adjustment of the semiconductor laser 10 or an active optical element, not shown, in the transmitting beam path, in order to level the collimated beam automatically.

Apart from an item of information about the inclination of the device in space, taking into account the azimuth, that is to say the angle at which the measuring beam is incident on the measured object surface in the horizontal plane, expands the capabilities of the distance measurement, to be specific in the form of a polar registration of the measured values. For this purpose, the device can be assigned a digital magnetic compass 35, of which the azimuth reference direction is aligned parallel to the optical axis 13 of the collimator objective lens 12. A plurality of distance measurements, taking into account the inclination and the azimuth of the measuring beam, allow in a manner known per se the determination of points and areas in space and also the determination of the position of areas in relation to each other from a single measuring location. Likewise, the computational determination of horizontal distances is possible, as is otherwise only possible in the case of measurement systems having mechanical axes, electronic tachymeters.

The front surface, the rear surface or else the center of the housing 20 of the device can be defined as the zero point of the measurement and can optionally be entered, for example via the keyboard 33, into the evaluation device 25 and automatically taken into account by the latter during the distance measurement.

Figure 2:
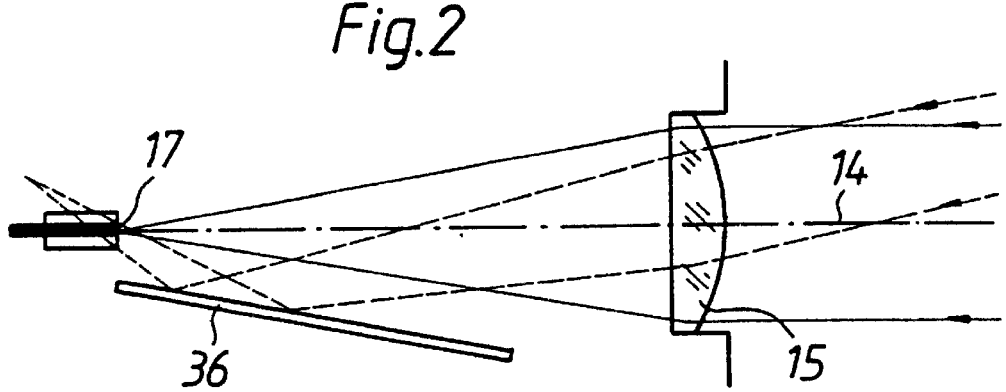
FIG. 2 shows a receiving part having a mirror for beam deflection.

FIG. 2 shows a first possible solution for deflecting the beam reflected from near object surfaces in the direction of a stationary light guide entry surface 17. Used for this purpose is a planar mirror 36, which is arranged outside the optical axis 14 and oblique to it, but which can also be lightly curved and scattering. The expedient shape, arrangement and configuration can easily be determined by means of trials. To compensate for any crooked positions present between the optical axes 13, 14, it can be particularly expedient to design the mirror in a torus shape around the optical axis 14. The arrangement described has the advantage that the radiation received from distant objects is not influenced by the deflection means.

Figure 3:
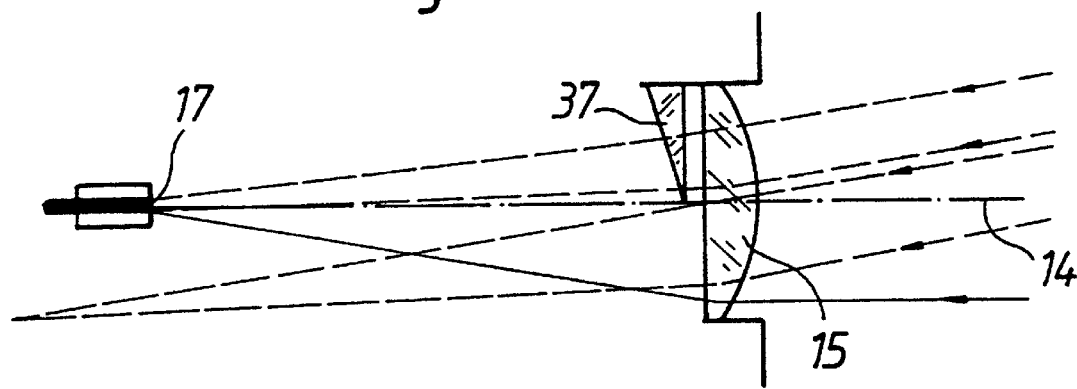
FIG. 3 shows a receiving part with refractive beam deflection.

In FIG. 3, as a further possibility for deflecting the obliquely incident measuring beams, a prism 37 is provided as refractive element. Here, too, the most expedient arrangement of the prism 37 can be determined by trials in which, on the one hand, the radiation received from distant objects is not deflected to such an extent that intensity fluctuations occur and, on the other hand, a sufficient proportion of the obliquely incident measuring beams are deflected in the direction of the light guide entry surface 17. It can in particular be advantageous to arrange the refractive surface to be ring-symmetrical to the optical axis 14, and to leave a part in the center uninfluenced. The prism 37 can also be switchable, so that it becomes effective only in the case of small distances from the object.

Figure 4:
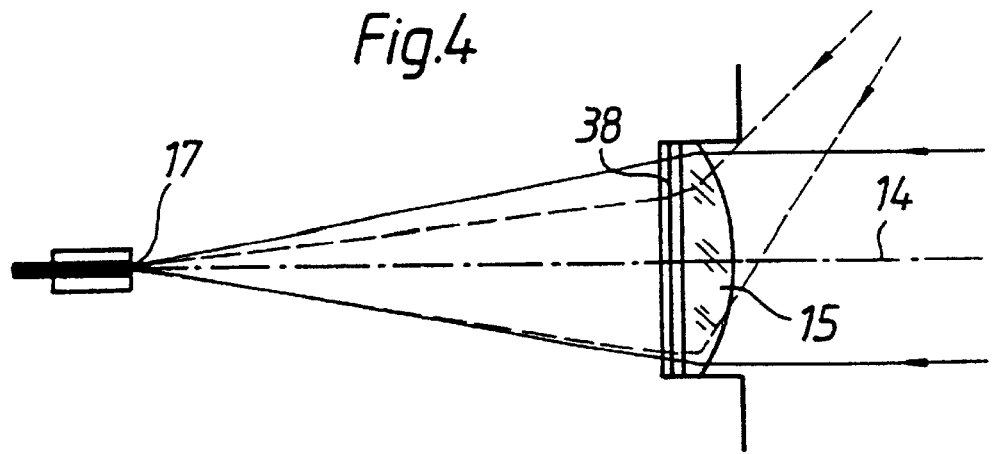
FIG. 4 shows a receiving part with diffractive beam deflection.

FIG. 4 shows a further possibility for the direction-dependent beam deflection with the aid of a diffractive element 38. Such elements are gaining increasing importance as a result of the development of microstructuring technology for holographic elements, zone plates and binary optics. A review of the configuration and application of such elements can be found in a publication from the Centre Suisse d'Electronique et de Microtechnique S.A., on Diffractive Optical Elements (DOE), June 1991. The advantage of these elements lies in the fact that the diffractive structure can be matched to individual image properties. In this case, even complicated optical transformation functions can be realized relatively simply. In particular, a diffraction structure can be calculated and produced photolithographically to deflect beams that are incident from different directions in the same direction. The acceptance angle of the objective lens 15 in the direction of the transmitted beam can thus be significantly enlarged.

Figure 5:
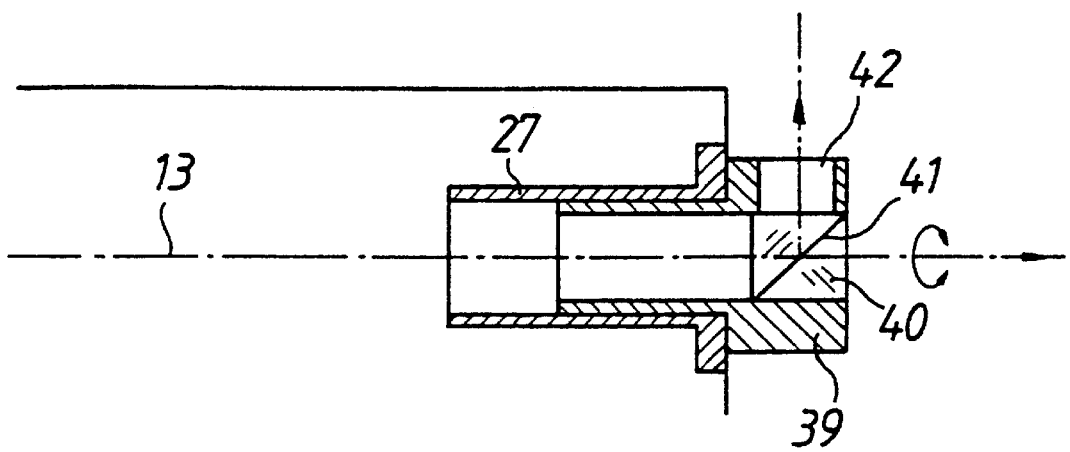
FIG. 5 shows a beam splitter used in the transmitting beam and FIG. 6 shows a deflection prism which can be switched into the transmitting beam.

An expansion of the field of application of the device according to the invention results from the use of a rotatable two-beam prism in the emergent collimated measuring beam. As shown in FIG. 5, for this purpose the terminating disk 26 can be removed and a tube 39 can be inserted into the tubular aperture stop 27 in its place. A prism 40 with a beam splitting cemented surface 41 is inserted into the tube 39. In this manner, an additional visible beam can be generated at right angles to the optical axis 13 of the measuring beam, through an opening 42 in the tube 39. This beam can be used, for example, to place on a surface which is present in order to be able to measure distances at right angles to this surface. In the case of a device directed at right angles to the object to be measured, distance values to other surfaces can also be transmitted using the additional beam.

The auxiliary means, shown in FIG. 5, for generating an orientation beam at right angles to the measuring beam can also be modified in a manner known per se by means of prisms having a plurality of splitter surfaces or other beam deflection means, such as in the case of a pentaprism.

Figure 6:
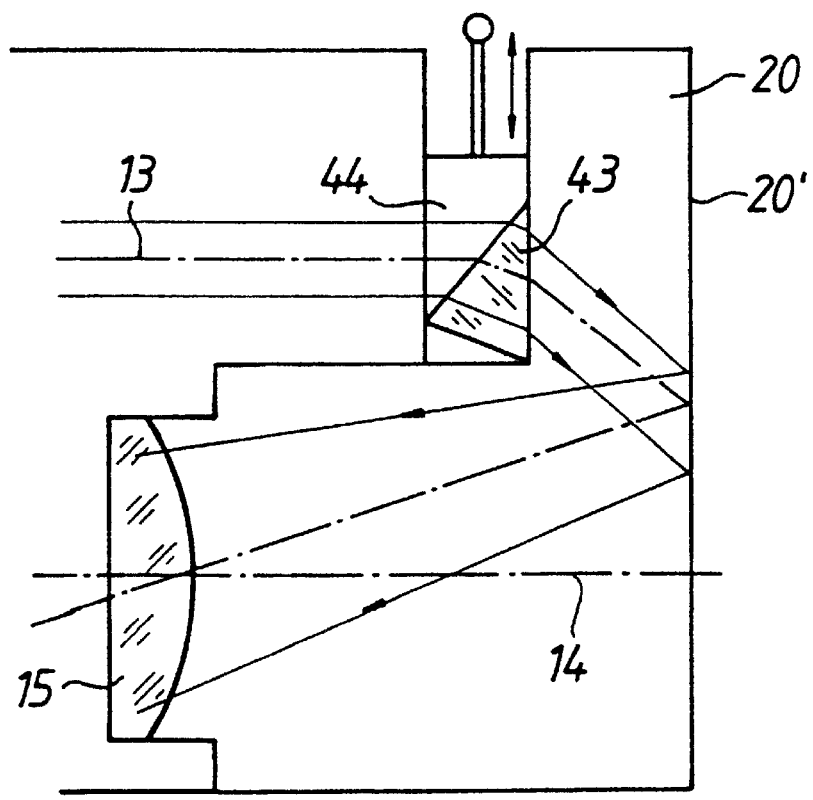

A further task of the auxiliary means can consist in deflecting the optical axis 13 of the measuring beam in the direction of the optical axis 14 of the receiving objective lens 15. Such a configuration is shown in FIG. 6. It has the advantage that even objects resting on the front side 20' of the housing 20 reflect radiation into the receiving beam path. For structural reasons related to the mounting of the objective lens 15, it is advantageous in this case to offset the receiving objective lens 15 somewhat into the housing 20. The prism 43, provided for the deflection of the beams, is arranged on a slide 44 which, during the measurement of very short distances, can be pushed into the beam path by hand.

The outlay on functional elements for the device according to the invention is low and the elements are suitable for miniaturization. The device can therefore be configured to be very compact and in particular as a pocket device.

We claim:

1. A device for distance measurement, comprising:
   a visible measuring beam (11) generated by a semiconductor laser (10),
   a collimator objective lens (12) for collimating the measuring beam (11) along an optical axis (13) of the collimator objective lens (12),
   a circuit arrangement for modulating the measuring beam,
   a receiving objective lens (15) for receiving and imaging the measuring beam (11) reflected at a distant object (16) onto a receiving device,
   a switchable beam deflection device (28) for generating an internal reference path between the semiconductor laser (10) and the receiving device, and
   an electronic evaluation device (25) for determining and displaying a distance to the object (16),
   wherein the receiving device includes a light guide (17') with an optoelectronic converter (24) connected downstream thereof, an entry surface (17) of the light guide (17') being arranged in an image plane of the receiving objective lens (15) for large distances to the object and being controllably displaceable from this position transversely to an optical axis (14) of the receiving objective lens (15).

2. A device for distance measurement, comprising:
   a visible measuring beam (11) generated by a semiconductor laser (10),
   a collimator objective lens (12) for collimating the measuring beam (11) along an optical axis (13) of the collimator objective lens (12),
   a circuit arrangement for modulating the measuring beam,
   a receiving objective lens (15) for receiving and imaging the measuring beam (11) reflected at a distant object (16) onto a receiving device,
   a switchable beam deflection device (28) for generating an internal reference path between the semiconductor laser (10) and the receiving device, and
   an electronic evaluation device (25) for determining and displaying a distance to the object (16),
   wherein the receiving device includes a light guide (17') with an optoelectronic converter (24) connected downstream thereof, an entry surface (17) of the light guide (17') being arranged along an optical axis (14) of the receiving objective lens (15) in an image plane of the receiving objective lens (15) for large distances to the object, and optical means (36; 37; 38) being provided between the receiving objective lens (15) and the light guide entry surface (17), outside the optical axis (14) of the receiving objective lens (15) for short distances to the object, such that the image position of the measuring beam (11) is deflected by the optical means towards the optical axis (14) of the receiving objective lens (15).

3. The device according to claim 1, wherein the measuring beam is pulse modulated with excitation pulses each having a pulse width below two nanoseconds.

4. The device according to claim 1, wherein the light guide (17') has a plurality of curves along its length.

5. The device according to claim 1, further comprising a mechanical adjusting device (18, 19, 21, 22) for adjusting a position of the light guide entry surface (17) in a plane which is defined by the optical axes (13, 14) of the collimator objective lens (12) and receiving objective lens (15).

6. The device according to claim 5, wherein the adjusting device can additionally be adjusted at right angles to the plane defined by the optical axes (13, 14).

7. The device according to claim 5, further comprising a motorized drive with a control device for moving the adjusting device over a predetermined adjustment range (18'), such that a light intensity received at the light guide entry surface is optimum for signal evaluation.

8. The device according to claim 7, wherein the adjusting device comprises a spring joint (19) with a motor-driven eccentric (21, 22).

9. The device according to claim 1, wherein the switchable beam deflection device includes a light-scattering element (28) having a scattering characteristic (30) that is matched to the adjustment range (18, 18') of the light guide entry surface (17).

10. The device according to claim 2, wherein the optical means includes a reflector (36) inclined with respect to the optical axis (14) of the receiving objective lens (15).

11. The device according to claim 2, wherein the optical means includes a refractive optical element (37) arranged along an edge region of the receiving objective lens (15).

12. The device according to claim 2, wherein the optical means includes a diffractive optical element (38) arranged adjacent to the receiving objective lens (15).

13. The device according to claim 2, further comprising an electronic inclinometer (34) for measuring an inclination of the optical axis (13) of the collimator objective lens (12).

14. The device according to claim 13, wherein output signals of the inclinometer (34) are fed to the evaluation device (25) as additional input signals.

15. The device according to claim 13, wherein output signals of the inclinometer (34) are fed to an actuator for leveling the collimated measuring beam (11).

16. The device according to claim 2, further comprising a two-axis electronic inclinometer (34) for measuring an inclination of the optical axis (13) of the collimator objective (12) and an inclination of the plane formed by the optical axes (13, 14) of the collimator objective lens (12) and of the receiving objective lens (15).

17. The device according to claim 2, further comprising a digital magnetic compass (35) for aligning an azimuth reference direction parallel to the optical axis (13) of the collimator objective lens (12).

18. The device according to claim 2, further comprising a prism (40, 41; 43) arranged between the collimator objective lens and the distant object.

19. A device for distance measurement, comprising:
a visible measuring beam (11) generated by a semiconductor laser (10),
a collimator objective lens (12) for collimating the measuring beam (11) along an optical axis (13) of the collimator objective lens (12),
a circuit arrangement for modulating the measuring beam,
a receiving objective lens (15) for receiving and imaging the measuring beam (11) reflected at a distant object (16) onto a receiving device,
a switchable beam deflection device (28) for generating an internal reference path between the semiconductor laser (10) and the receiving device,
an electronic evaluation device (25) for determining and displaying the distance measured to the object (16), and
an electronic inclinometer (34) for measuring an inclination of the optical axis (13) of the collimator objective lens (12),
wherein the measuring beam is pulse modulated with excitation pulses each having a pulse width below two nanoseconds, and
wherein output signals of the inclinometer (34) are fed to an actuator for leveling the collimated measuring beam (11).

20. The device according to claim 19, wherein the receiving device includes a light guide (17') having an optoelectronic converter (24) connected downstream thereof, the light guide (17') having a plurality of curves along its length.

21. The device according to claim 19, wherein the electronic inclinometer comprises a two-axis electronic inclinometer (34) for measuring the inclination of the optical axis (13) of the collimator objective lens (12) and an inclination of the plane formed by the optical axes (13, 14) of the collimator objective lens (12) and of the receiving objective lens (15).

22. The device according to claim 19, further comprising a digital magnetic compass (35) for aligning an azimuth reference direction parallel to the optical axis (13) of the collimator objective lens (12).

23. The device according to claim 19, wherein output signals of the inclinometer (34) are fed to the evaluation device (25) as additional input signals.

24. The device according to claim 19, further comprising a prism (40, 41; 43) arranged between the collimator objective lens and the distant object.

25. A device for distance measurement, comprising:
a semiconductor laser for generating a laser beam;
a collimator objective lens for collimating the laser beam along an optical axis of the collimator objective lens and guiding the laser beam toward a distant object;
a receiving objective lens for receiving and imaging the laser beam reflected from the distant object along an optical axis of the receiving objective lens, the optical axis of the receiving objective lens being parallel to the optical axis of the collimator objective lens;
a light guide having an entry surface at which the laser beam imaged by the receiving objective lens is received, a position of the entry surface being adjustable in a direction transverse to the optical axis of the receiving objective lens;
a switchable beam deflection device for generating an internal reference path between the semiconductor laser and the entry surface;
an optoelectronic converter connected to the light guide for converting the laser beam received at the entry surface of the light guide to electrical signals; and
an electronic evaluation device for determining the distance measured to the distant object based on the converted electrical signals.

26. The device according to claim 25, further comprising a circuit for pulse modulating the laser beam to have pulse widths below two nanoseconds.

27. The device according to claim 25, wherein the light guide has a plurality of curves along its length.

28. The device according to claim 25, further comprising an electronic inclinometer for measuring an inclination of the optical axis of the collimator objective lens.

29. The device according to claim 25, further comprising a two-axis electronic inclinometer for measuring an inclination of the optical axis of the collimator objective and an inclination of a plane formed by the optical axes of the collimator objective lens and of the receiving objective lens.

30. The device according to claim 29, further comprising a digital magnetic compass for aligning an azimuth reference direction to be parallel to the optical axis of the collimator objective lens.

31. The device according to claim 29, wherein output signals of the inclinometer are fed to the evaluation device as additional input signals.

32. The device according to claim 28, further comprising an actuator for leveling the collimated laser beam, the actuator being controlled in accordance with output signals from the inclinometer.

33. The device according to claim 25, further comprising a motorized drive for moving the position of the entry surface over a predetermined adjustment range such that a light intensity received at the entry surface is optimum for signal evaluation.

34. The device according to claim 33, further comprising a spring biasing the entry surface to a neutral position.

35. The device according to claim 34, wherein the motorized drive includes an eccentric member for moving the entry surface away from the neutral position.

* * * * *